United States Patent [19]

Parriaux et al.

[11] Patent Number: 4,938,595
[45] Date of Patent: Jul. 3, 1990

[54] DIFFRACTION PHOTOELECTRIC DISPLACEMENT MEASURING DEVICE

[75] Inventors: Olivier Parriaux, Lausanne, Switzerland; Francois Cochet, Neuchatel, France

[73] Assignee: Dr. Johannes Heidenhain GmbH, Traunreut, Fed. Rep. of Germany

[21] Appl. No.: 77,190

[22] Filed: Jul. 24, 1987

[30] Foreign Application Priority Data

Jul. 26, 1986 [DE] Fed. Rep. of Germany ....... 3625327

[51] Int. Cl.$^5$ .................................................. G01B 9/02
[52] U.S. Cl. .................................. 356/356; 250/237 G; 350/96.12
[58] Field of Search ............... 356/353, 354, 355, 356, 356/358; 250/237 G, 231 SG; 350/96.12, 96.15, 96.17

[56] References Cited

U.S. PATENT DOCUMENTS

3,900,264 8/1985 Heitmann et al. ................... 356/356
4,286,838 9/1981 Huignard et al. ................. 350/96.12
4,629,886 12/1986 Akiyama et al. .

FOREIGN PATENT DOCUMENTS

0006482 1/1980 European Pat. Off. .
0006052 1/1981 European Pat. Off. .
3316144 11/1983 Fed. Rep. of Germany .
59-164914 9/1984 Japan .
1270875 4/1972 United Kingdom .
2146765 4/1985 United Kingdom .

OTHER PUBLICATIONS

3×2 Channel Waveguide Gyroscope Couplers: Theory, IEEE Journal of Quantum Electronics, vol. QE-18, No. 10, Oct. 1982.
"Theory of Prism-Firm Coupler and Thin-Film Light Guides", J. Optical Soc. of America, vol. 60, (1970), pp. 1325-1337, Tien, et al.

Primary Examiner—Vincent P. McGraw
Assistant Examiner—S. A. Turner
Attorney, Agent, or Firm—Willian Brinks Olds Hofer Gilson & Lione

[57] ABSTRACT

The invention relates to an interferometric displacement measuring device in which the reference norm is a diffraction grid (G). Diffracted partial beam bundles (+m, −m) are fed into a coupler (TBJ) by means of coupling grids (+HG, −HG) via beam waveguides (+LWL, −LWL) and there brought into interference. The interfering partial beam bundles are transmitted from the outputs (+A, A, −A) via beam waveguides (+LWL, LWL, −LWL) to detectors (+D, D, −D) which convert them into electric signals out-of-phase with each other. The displacement of the diffraction grid (G) is a standard for measuring the changes in position of machine components which are movable relative to one another.

9 Claims, 2 Drawing Sheets

DIFFRACTION PHOTOELECTRIC DISPLACEMENT MEASURING DEVICE

BACKGROUND OF THE INVENTION

The present invention relates to a photoelectric displacement measuring device.

In recent years, the development of measurement instruments in the area of length and displacement measurement has progressed enormously. For example, measurement devices have been developed for process technology and testing purposes. These devices are based upon the application of light, magnetism and the like through the use of electronic circuitry. Devices, which make use of light for measuring, are known as lightwave-interference measurement devices in which the wave-length of laser beams is drawn upon as reference magnitudes. The high precision of these measurement devices fulfills the demands of today's industrial technology to a sufficient degree, but in many cases, this high degree of accuracy requires a substantial economic outlay.

As an example of a measurement device in which the property of magnetism is exploited, GB-PS 1 270 875 discloses a magnetic measurement system in which a magnetic measurement is first recorded on a band-like magnetic element as the reference size in order to determine the relative position between this magnetic sample and a magnetic head. However, in this system, the accuracy is determined by the fineness of the magnetic differences which can be recorded on the magnetic element with a division of approximately 0.2 mm. Through interpolation of the measurement signals, one achieves a resolution of approximately 5 $\mu$m–10 $\mu$m, so that the accuracy of the measurement is about two orders of magnitude worse than in the case of a lightwave-interference measurement device, which can achieve a resolution of approximately 0.1 $\mu$m. Thus, for example, in the case of a machine tool, a measurement device is required whose average accuracy lies between the accuracy of a lightwave-interference measurement device and the accuracy of a magnetic measurement device, so that an optical diffraction grid can be utilized whose grid constant lies in the order of magnitude of a few micrometers. Such a measurement device represents a compromise between required accuracy and justifiable costs. These types of devices, and their operation are described in DE-OS 33 16 144 and JP-OS 59-164 914.

In these types of devices, the diffraction grid constitutes the reference medium. A diffraction grid consists of very thin grid lines placed quite close together on a glass or metal plate. The grid lines may be formed by mechanical processing, an optical lithographic process, electron beam lithography or some similar process. The devices further comprise: a light source which emits monochromatic light, for example, a laser light, and a detector which receives the interference light located on the same side of the grid, and two reflector mirrors opposite of the light source on the other side of the grid. The beam of light emitted by the light source is diffracted by the diffraction grid and allowed to pass through. A light beam diffracted by the diffraction grid represents diffracted light (a diffracted light bundle) of the Nth degree, and under the influence of the diffraction grid, a value $N\xi$ in the wave front of the light is produced, which is the product of the degree number and the phase. A light beam, however, which passes in a straight line through the diffraction grid, does not contain any phase information. Both light beams are reflected by the reflector mirrors and return along their outbound path in order to reenter the diffraction grid and once again be diffracted and pass through. The light of the straight beam which has passed through the grid and the light diffracted to the N-th degree are spatially selected, interfere with one another, and strike a detector. The phase of the diffraction grid imparts a value $-N\xi$ to the second diffracted light, while the first straight light beam has a value of $N\xi$, so that when the two light beams interfere, a value of $2N\xi$ is obtained, the value being double the amount of the phase of the diffraction grid. If one therefore assumes that the diffraction grid is moved relative to another part of the optical system, for example, relative to the light source and the reflector mirrors, then the interference light moves across 2N periods while the diffraction grid moves across one period.

In another known arrangement where a semi-transparent mirror or the like is employed, the light beam emitted by the light source is diffracted by the diffraction grid, and light bundles of the same order but with differing signs overlap and interfere with each other, prior to entering the detector. In this case, one obtains values $N\xi$ and $-N\xi$ due to the phase of the diffraction grid in the diffracted light beams, whereby N is the diffraction order number, so that one receives the interference light $2N\xi$ or, in other words, an amount which is twice as large as the phase of the diffraction grid. Thus, if one once again assumes that the diffraction grid and some other part of the optical system move relative to one another, as already explained above, the interference light moves across 2N periods while the diffraction grid moves across one period.

In order to be able to accommodate the described arrangement in small areas, it is necessary to compensate angles of the light beams relative to the diffraction grid. If, however, the relative position of the optical system with regard to the diffraction grid is shifted in the direction of the grid lines of the diffraction grid, a phase change takes place, which is similar to that phase change that occurs when the relative movement occurs perpendicular to the plane of the diffraction grid, so that measurement accuracy declines. If the light beam enters vertically, the disadvantage described above will be avoided, however, the optical system will be quite extensive and thus relatively large amounts of space must be provided.

It is therefore an object of the present invention to avoid the above-mentioned disadvantage and create a displacement measurement device that is simple in construction and which is generally capable of excluding disturbances caused by ambient influences thereby assuring a reliable mode of operation. Other objects of the present invention will become apparent from the following description.

SUMMARY OF THE INVENTION

In accordance with the present invention, there is provided a photoelectric displacement measuring device for measuring the relative positions of two objects. The device comprises a light emitting source and at least one moveable diffraction grid which is arranged perpendicular to the direction of emission of the light emission source. The grid is constructed such that upon the transmission or inpingement of light beams, at least two diffracted partial beam bundles are created. The device comprises a means for coupling at least two of the partial beam bundles into two beam waveguides. The beam bundles are then transmitted by said means through two inputs of a coupler and allowed to interfere in the coupler such that the signals out of phase with each other can be detected at the output of the coupler.

The advantages of the device of the present invention will become apparent from the following description, which when taken in conjunction with the accompanying drawings, discloses presently preferred exemplary embodiments of the present invention. It should be understood, however, that this description is intended to be illustrative rather than limiting, the scope of the present invention being defined by the appended claims.

BRIEF DESCRIPTION OF THE DRAWINGS

Presently preferred exemplary embodiments of the present invention summarized above are illustrated in the following drawings.

DETAILED DESCRIPTION OF THE DRAWINGS AND PREFERRED EMBODIMENTS

In accordance with the present invention, a displacement measurement device as described herein has been discovered which is compact in design and may be easily integrated with other components. Further, disturbances caused by outside ambient influences are substantially eliminated thereby insuring a reliable operational mode. Thus, there is provided in accordance with the present invention, a simply constructed and economical displacement measurement device of high measuring precision.

Figure 1:
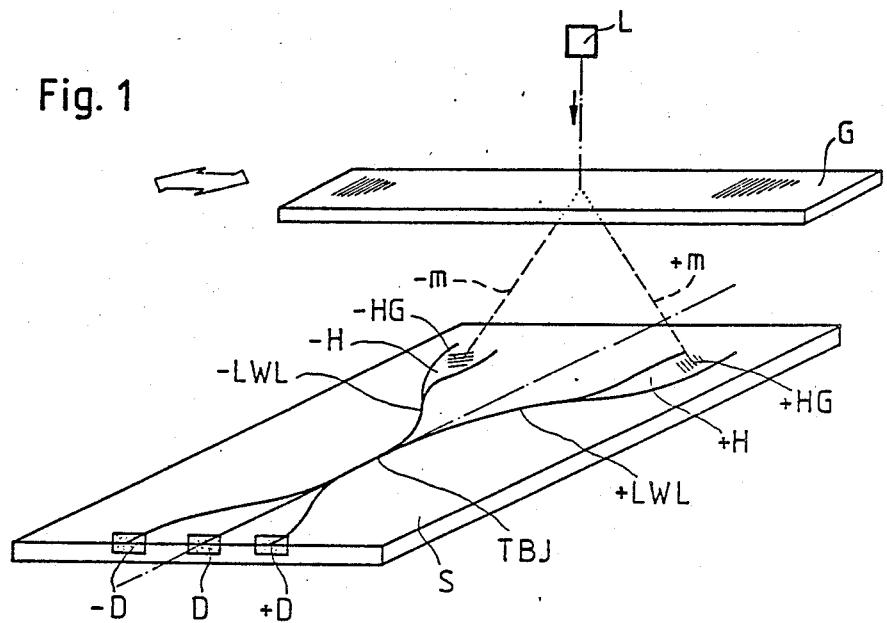
FIG. 1 depicts a transmitted light measurement device.

A transmitted light measurement device is shown in FIG. 1 displaying a semi-conductor laser L as the light source A moveable diffraction grid G is arranged perpendicular to the direction of emission from the light source. The semi-conductor laser L may be, for example, mounted in the base of a machine tool not shown in the diagram. The diffraction grid G may then be, for example, similarly mounted in the cradle of the machine tool. The relative movement between the base and cradle is measured as machine movement. Thus, this relative movement corresponds to the relative displacement between the semi-conductor laser L and the diffraction grid G.

The beam of the semi-conductor laser L is diffracted on the diffraction grid G and partial beam bundles +m and −m are created in the same order, but with opposing signs.

The partial beam bundles +m and −m fall upon a substrate S which is also firmly attached to the machine tool base not shown in the diagram. Two coupling means +H, +HG and −H, −HG, two beam waveguides +LWL and −LWL, a coupler TBJ as well as three detectors +D, D, −D may be located on the substrate S. In the device illustrated, these elements are aggregated in the form of an integrated optical circuit on the substrate S.

Figure 2:
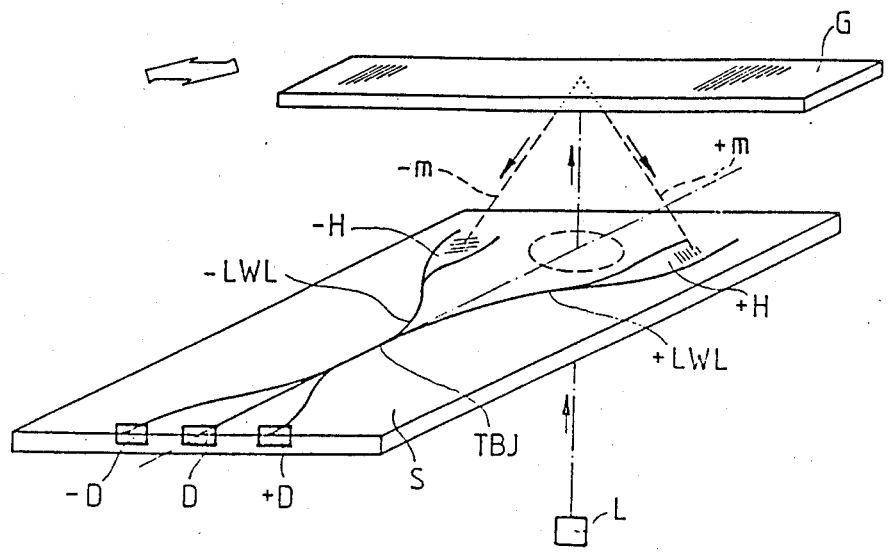
FIG. 2 depicts an impinging light measurement device.

FIG. 2 shows a similar arrangement to that in FIG. 1, except that the semi-conductor laser L is located on the same side of diffraction grid G as the substrate S. This is referred to as an impinging measurement device. Since the construction components shown herein correspond to those shown in FIG. 1, the same identifying letters may be used.

The components employed may comprise those commonly known in the art. The components of the optical circuit may also comprise fiber optics, the use of which, however, does not necessitate additional exemplary drawings. Those skilled in the art will readily understand and recognize such an arrangement containing corresponding fiber optic components.

The partial beam bundles +m and −m strike the coupling means which may be present as coupling grids +HG and −HG in the form of adiabatic horns +H and −H. It is principally known from EP-BI-0006052, which is incorporated herein by reference, how to transmit light with the aid of coupling grids into waveguides of integrated optical circuits.

Various methods are available to focus the light as required. For reasons of technical manufacture and appropriately also from a cost standpoint, the so-called horns are preferred since they are easy to design and manufacture, and their optical degree of efficiency is sufficient. The form of the horns +H and −H is generally parabolic and is determined according to optical and geometric conditions such as the position of the coupling grid +HG or −HG with the horn +H or −H respectively, its diffraction structure, the direction and the wavelength of the impacting collimated light, etc.

The configuration of the horns +H and −H may be readily determined and easily formulated by those skilled in the art according to the particulate requirements.

Figure 3:
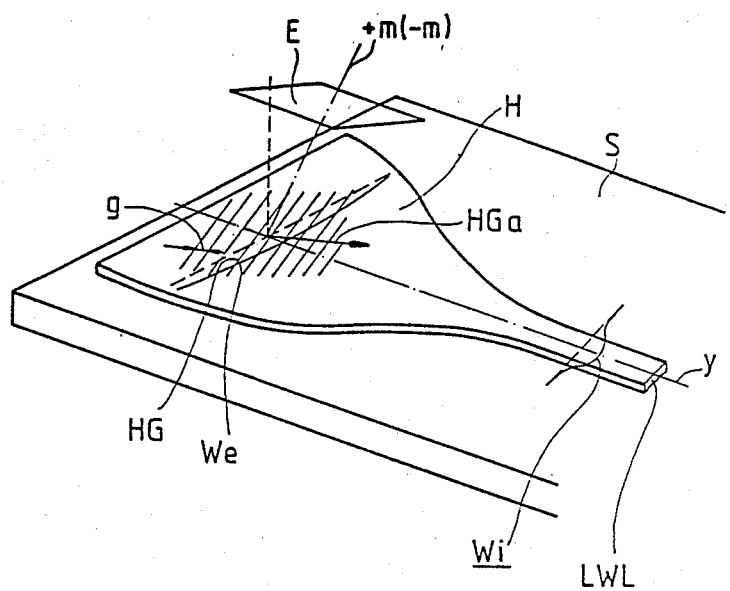
FIG. 3 depicts a coupling grid employed in integrated optics.

FIG. 3 depicts a horn H schematically displayed on a substrate S. The narrow point of the horn leads into a beam waveguide LWL which may also be constructed out of fiber optics. It should be noted that the axis HGa of coupling grid HG forms a specific angle with the axis Y of horn H, which is also dependent on the previously mentioned optical and geometric conditions. The plane E of the wave front of both partial beam bundles +m (−m), the axis HGa of the coupling grid HG, and the expansion fronts We and Wi of the light wave are also shown in a plane of the horn H and of the beam waveguide LWL on the coupling grid HG.

Figure 4:
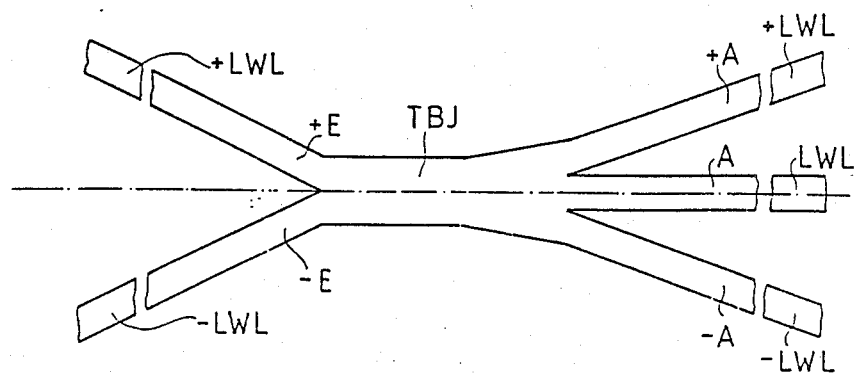
FIG. 4 depicts a coupler.

FIG. 4 schematically illustrates a so-called 2×3 coupler which may also be termed a "three-branch junction." The theory of this type of coupler—here, in fact shown as a 3×2 coupler—is described in an article by William K. Burns and A. Fenner Milton: "3×2 Channel Waveguide Gyroscope Couplers: Theory" IEEE Journal of Quantum Electronics, Vol. QE-18, No. 10 Oct. 1982 the contents of which is incorporated herein by reference.

The coupled partial beam bundles +m and −m are fed into input areas comprising inputs +E and −E of the coupler TBJ through beam waveguides +LWL and −LWL and brought into interference in an interference area. The coupler TBJ may be constructed such that signals out-of-phase with each other can be produced at its output area comprising three outputs +A, A, −A. The signals may be 120° out-of-phase to each other, but signals may also occur at the two outputs +A and −A which represent a sin or a cosin function, whereby a reference signal occurs at output A. The signals at the outputs +A, A, −A are then transmitted to detectors +D, D, −D via beam waveguides LWL (see FIGS. 1 and 2), from which they are converted into electric signals and transmitted further to an electronic evaluation circuit.

The displacements of the diffraction grid G are thus transformed generally into digitally displayed position values which may be used to measure relative machine movements.

It is to be understood that a wide range of changes and modifications to the embodiments described above will be apparent to those skilled in the art. It is therefore intended that the foregoing detailed description with respect to these particular embodiments be regarded as illustrative rather than limiting, and that it be understood that it is the following claims including all equivalents which are intended to define the spirit and scope of this invention.

I claim:

1. In a photoelectric displacement measuring device for measuring the relative positions of two objects, said device comprising a light emitting source and at least one movable diffraction grid which is perpendicular to the direction of emission of said light emission source, said grid creating at least two diffracted partial beam bundles which are brought into interference by means of optical elements, and the interfering partial beam bundles are converted into electric signals out-of-phase with each other, the improvement in which said device comprises at least two beam waveguides (+LWL, −LWL), means for coupling said (+LWL, −LWL), and a coupler (TBJ) for receiving said beam bundles transmitted by said beam waveguides (+LWL, −LWL), said coupler (TBJ) comprising an input area, an area for allowing said beam bundles to interfere, and an output area where signals produced which are out-of-phase with each other may be detected.

2. The photoelectric displacement measuring device of claim 1, wherein said coupler (TBJ) comprises two inputs (+E, −E) and three outputs (+A, A, −A), and that when two partial beam bundles (+m, −m) are fed into two inputs (+E, −E) of the coupler (TBJ), signals out-of-phase with each other are created at at least two of the three output terminals (+A, A, −A).

3. The photoelectric displacement measuring device of claim 1 wherein said coupler (TBJ) comprises three outputs (+A, A, −A) and that at two outputs (+A, −A) two output signals are generated which represent a sin or a cosin function and that at one output (A) a reference signal is generated.

4. The photoelectric displacement measuring device of claim 1 wherein said coupler (TBJ) comprises three outputs (+A, A, −A) whereat three output signals are generated each of which is 120° out-of-phase with the other.

5. The photoelectric displacement measuring device of claim 1 wherein said coupling means comprises coupling grids (+HG, −HG) in the form of adiabatic horns (+H, −H).

6. The photoelectric displacement measuring device of claim 1 wherein said coupling means, said beam waveguides (+LWL, LWL, −LWL) and said coupler form an integrated optical circuit on a substrate (S).

7. The photoelectric displacement measuring device of claim 6 wherein the integrated optical circuit contains detectors (+D, D, −D).

8. The photoelectric displacement measuring device of claim 1 wherein said coupling means, said beam waveguides (+LWL, LWL, −LWL) and said coupler comprise fiber optics.

9. The photoelectric displacement measuring device of claim 1 wherein said light emitting source comprises a laser (L).

* * * * *

UNITED STATES PATENT AND TRADEMARK OFFICE
CERTIFICATE OF CORRECTION

PATENT NO. : 4,938,595
DATED : July 3, 1990
INVENTOR(S) : Olivier Parriaux et al.

It is certified that error appears in the above-identified patent and that said Letters Patent is hereby corrected as shown below:

On title page, item [56],

IN THE REFERENCES CITED after "3,900,264" delete "8/1985" and substitute --8/1975--.

Column 5, claim 1, line 12, after "said" insert --partial beam bundles (+M, -M) into said beam waveguides--

Signed and Sealed this

Thirtieth Day of March, 1993

*Attest:*

STEPHEN G. KUNIN

*Attesting Officer*    Acting Commissioner of Patents and Trademarks